Patented Apr. 28, 1953

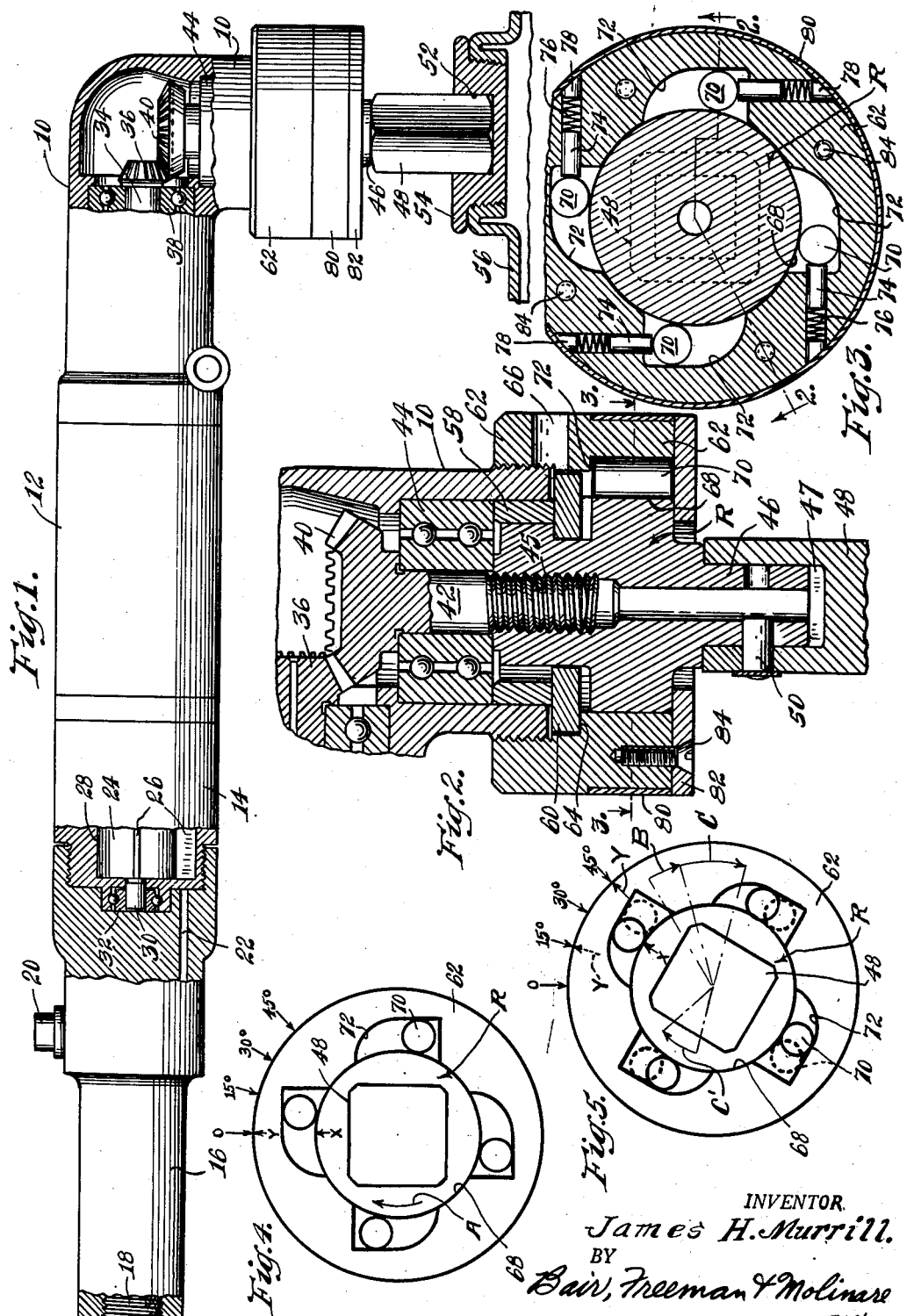

2,636,410

UNITED STATES PATENT OFFICE 2,636,410

POWER-OPERATED SOCKET WRENCH

James H. Murrill, Bryan, Ohio, assignor to Aro Equipment Corporation, Bryan, Ohio, a corporation of Ohio Application April 15, 1950, Serial No. 156,161

2 Claims. (Cl. 81—54)

1

This invention relates to a nut setting wrench and particularly one of the power-operated type.

One object of the invention is to provide a power operated wrench with a convenient means for setting the nut by hand after it has been rapidly rotated to a position suitable for setting.

Another object is to provide a means for hand-setting a nut or the like applied to a power-operated wrench.

Still another object is to provide a motor driven nut rotating means for rapidly rotating a nut to position for setting whereupon the motor is stalled, the tool then being capable of manual rotation of the nut to a tightly set position.

A further object is to provide a nut rotating motor in which the motor extends radially with respect to the axis of rotation of the nut and can therefore be used as a handle for manually setting the nut after it has been rotated to position for setting.

Still a further object is to provide a motor rotated nut engaging element and a housing for the motor that acts as a manual lever which is connected by a one-way clutch to the nut rotating head, so that when the lever is swung in the proper direction after the motor is stalled, the nut rotating head will be rotated by the lever for setting the nut beyond the power capacity of the motor and without having to provide a complicated and expensive impacting arrangement or the like for the nut setting operation.

With these and other objects in view, my invention consists in the construction, arrangement and combination of the various parts of my nut setting wrench, whereby the objects contemplated are attained, as hereinafter more fully set forth, pointed out in my claims and illustrated in the accompanying drawings, wherein:

Figure 1 is a side elevation of a nut setting wrench embodying my present invention, portions thereof being broken away and other portions shown in section.

Figure 2 is an enlarged sectional view through the right hand end of the wrench to show details of construction.

Figure 3 is a sectional view on the line 3—3 of Figure 2 showing the one-way clutch connection between a motor housing which serves as a handle and the nut rotating head, the line 2—2 thereon indicating the line along which the wrench is sectioned in Figure 2.

Figure 4 is a diagrammatic view showing the nut rotating step of a nut setting operation; and Figure 5 is a similar diagrammatic view showing the nut setting operation per se.

On the accompanying drawing I have used the reference numeral 10 to indicate an angle head housing, 12 a gear reducer section, 14 a motor section, and 16 a control extension for the

2 motor section 14. The sections 10, 12, 14 and 16 constitute an elongated handle for a manual nut setting operation as will hereinafter appear.

The control extension 16 has an intake opening 18 into which a nipple of an air hose may be screwed for supplying compressed air to the motor section 14. This air may be controlled by a push button type of valve 20 which cuts off the air or permits it to flow through a passageway 22 to the motor section 14 as desired by the operator. Within the motor section the usual type of vane motor to be operated by compressed air is provided including a rotor 24 having blades 26 in slots thereof to cooperate with an eccentric stator bore 28, the shaft of the motor being shown at 30 and a ball bearing at 32 for journalling the same.

The shaft 30 of the motor is connected by means of suitable step-down gearing within the section 12 of the housing to an outlet shaft 34 provided with a bevel pinion 36 in the angle head housing 10. The gearing forms no part of my present invention and accordingly has not been illustrated.

The shaft 34 is journalled in a bearing 38. The pinion 36 meshes with a bevel gear 40 having a shaft 42 journalled in a ball bearing 44 in the angle head housing 10. The lower end of the shaft 42 is threaded as at 45 into a nut rotor R. This rotor has a square shank 46 on its lower end to be received in a socket 47 of an adapter 48 which may be retained in position by any suitable means such as a locking pin 50. The adapter 48 is interchangeable with other adapters of the appropriate size and shape or the nut that is to be rotated by the adapter. By way of illustration I show an adapter which is square on the outside to fit a square socket 52 in a bung 54 for a steel barrel 56.

A retainer sleeve 58 in the lower end of the housing 10 is shown in Figure 2 for retaining the bearing 44 in position. A washer 60 is then inserted to engage the retainer sleeve 58 and the washer 60 in turn is held in position by an extension housing 62 threaded on the outer surface of the housing 10. The extension housing has a shoulder 64 engaging against the washer 60 and is provided with a spanner hole 66 with which a spanner wrench can be engaged for tightening the extension housing 62 on the housing 10.

The nut rotor R has an enlarged disc-like portion 68 provided with a smooth hardened periphery and a plurality of clutch rollers 70 are adapted to coact therewith as shown in Figure 3. These rollers are located in sockets 72 of the extension housing 62 which sockets are tapered so that when the rotor R rotates clockwise in Figure 3, the clutch connection is freed. When the extension housing 62 is rotated clockwise relative to the rotor, the rollers 70 are wedged into the sockets 72 for causing rotation of the rotor with the extension housing. Spring plungers 74 and springs 76 back up the rollers to aid in the clutch engaging operation. The springs 76 are retained in position by plugs 78 and a band 80 around the extension housing. The band and the rollers are then retained in position by a cover plate 82 secured in position as by screws 84.

*Practical operation*

In the operation of my nut setting wrench, the bung 54 is started by hand in the threads of the barrel 56 and the adapter 48 may then be engaged in the socket 52 of the bung. The operator then holds the wrench with one hand on the housing section 10 adjacent the extension housing 62 and with his other hand on the control extension 16. Pressing the valve button 20 admits compressed air from the inlet 18 through the passageway 22 to the motor in section 14 so that the motor is operated for rapidly rotating the adapter 48 and thereby quickly screwing the bung 54 down to position for setting. This is shown diagrammatically in Figure 4, the extension housing 62 being positioned as indicated by a pointer Y opposite a pointer 0 (zero). The rollers 70 are held gently against the inner faces of the sockets 72 and the outer surface of the rotor portion 68. We can assume that the rotor R has been rotated until the motor stalled with the pointer X opposite the pointer 0.

Upon the motor stalling, the next operation is to set the nut by hand. This is accomplished by swinging the handle 10—12—14—16 in a clockwise direction, as indicated by the arrow B in Figure 5. The first very slight portion of this movement (exaggerated to 15° on the drawing merely for purposes of illustration) will move the pointer Y (with dotted lead line) to the pointer designated 15°, causing the rollers 70 to move from the dotted position of Figure 5 to the full-line position where they grip the periphery of the portion 68 of the rotor R, the distance moved being also shown exaggerated.

Assuming that thereafter it takes 30° movement to set the nut, the extension housing 16 may be swung manually so that the pointer Y is opposite the pointer 45° and the rotor R will be carried 30° in a clockwise direction until its pointer X is opposite the pointer 30° as shown in Figure 5. Thus the bung is first quickly rotated by power to a position for setting and then with a quick jerk of the handle, the bung is manually set by the leverage secured by the relatively long length of the handle 10—12—14—16, the setting operation being accomplished with much more power than the capacity of the motor and/or without providing an impacting mechanism as would be necessary if the power of the motor were used for setting the nut.

I have shown by way of illustration the tool being operated for setting the bungs of steel barrels, that being one place wherein a nut setter is particularly adaptable. These barrels are usually filled and then transferred along a roller conveyor for the bung to be inserted and set. The setting has to be rather tight, of course, to make the barrel leak-proof and yet it is desirable to do the bunging operation in a relatively short time. With my arrangement the bungs are initially rotated quickly by power means and can then be set manually without prohibitive effort in a minimum of time.

The device, of course, is adaptable for nuts, studs, and the like in addition to bungs as illustrated and of course the adaptor 48 may be of any size and shape suitable for various purposes.

Some changes may be made in the construction and arrangement of the parts of my nut setting wrench without departing from the real spirit and purpose of my invention, and it is my intention to cover by my claims any modified forms of structure or use of mechanical equivalents which may be reasonably included within their scope.

I claim as my invention:

1. A socket wrench comprising a rotor, power means for rotating said rotor, said power means extending transverse to the axis of said rotor to serve as an elongated handle, a continuous power transmitting connection joining said power means and said rotor, said rotor, when driven by said power means, rotating with respect to said handle, a clutch separate and apart from said power transmitting connection positioned between said handle and said rotor adapted to lock said handle and said rotor when said power means is inoperative and upon swinging said handle about the axis of said rotor in the direction of rotation of said rotor, said clutch being disconnected upon swinging said handle in the opposite direction, whereby said handle may be ratcheted about the axis of said rotor, and said handle and said rotor being declutched when said rotor is being driven by said power means.

2. A socket wrench comprising a rotor, power means for rotating said rotor, said power means extending transverse to the axis of said rotor to serve as an elongated handle, a continuous power transmitting connection joining said power means and said rotor, said rotor, when driven by said power means, rotating with respect to said handle, a clutch separate and apart from said power transmitting connection positioned between said handle and said rotor adapted to lock said handle and said rotor when said power means is inoperative and upon swinging said handle about the axis of said rotor in the direction of rotation of said rotor, said clutch comprising rollers positioned in tapered sockets, which sockets are formed between said handle and said rotor, said rollers being wedged in said sockets when said handle is swung in one direction to cause rotation of said rotor with said handle, and said rollers and said rotor being freed from wedging engagement upon said housing being swung in the opposite direction, whereby said housing may be ratcheted with respect to said rotor, and said rollers being freed from wedging engagement when said rotor is being driven by said power means.

JAMES H. MURRILL.

References Cited in the file of this patent

UNITED STATES PATENTS

| Number | Name | Date |
|---|---|---|
| 289,110 | Kempster | Nov. 27, 1883 |
| 1,384,811 | Strand | July 19, 1921 |
| 2,112,693 | Douglass | Mar. 29, 1938 |
| 2,179,724 | Kuehne | Nov. 14, 1939 |
| 2,184,394 | Moretti | Dec. 26, 1939 |
| 2,244,446 | Clark | June 3, 1941 |
| 2,264,012 | Wasson | Nov. 25, 1941 |
| 2,273,626 | Connell | Feb. 17, 1942 |
| 2,392,097 | Meunier | Jan. 1, 1946 |
| 2,578,279 | Bardwell | Dec. 11, 1951 |